(12) United States Patent
Klobucar et al.

(10) Patent No.: US 6,716,272 B2
(45) Date of Patent: Apr. 6, 2004

(54) SCRUBBER FOR PAINT BOOTHS

(75) Inventors: Joseph M. Klobucar, Detroit, MI (US); Guang Yu, Novi, MI (US); James L. Pakkala, Livonia, MI (US); Hugh F. Hussey, Novi, MI (US)

(73) Assignee: Durr Industries, Inc., Plymouth, MI (US)

( * ) Notice: Subject to any disclaimer, the term of this patent is extended or adjusted under 35 U.S.C. 154(b) by 30 days.

(21) Appl. No.: 10/093,334

(22) Filed: Mar. 7, 2002

(65) Prior Publication Data

US 2002/0189449 A1 Dec. 19, 2002

Related U.S. Application Data

(60) Provisional application No. 60/277,856, filed on Mar. 22, 2001.

(51) Int. Cl.[7] .................................................. B01D 47/10
(52) U.S. Cl. ............................. 95/216; 96/275; 96/323; 118/326; 55/DIG. 46
(58) Field of Search ..................... 95/216, 217; 96/267, 96/270, 271, 272, 275, 322, 323; 55/DIG. 46; 118/326

(56) References Cited

U.S. PATENT DOCUMENTS

| | | | | |
|---|---|---|---|---|
| 4,045,524 A | * | 8/1977 | Bornert | |
| 4,082,522 A | * | 4/1978 | Koga | |
| 4,266,951 A | | 5/1981 | Calvert | |
| 4,299,602 A | * | 11/1981 | Cordier et al. | |
| 4,328,012 A | * | 5/1982 | Telchuk, Jr. et al. | |
| 4,345,921 A | * | 8/1982 | Gustavsson et al. | |
| 4,350,506 A | * | 9/1982 | Otto | |
| 4,425,870 A | * | 1/1984 | Marshke | |
| 4,440,554 A | * | 4/1984 | Perry | |
| 4,515,073 A | * | 5/1985 | Dorsch et al. | |
| 4,664,060 A | * | 5/1987 | Roberts | |
| 4,704,952 A | | 11/1987 | Johnson et al. | |
| 4,721,033 A | * | 1/1988 | Bloomer et al. | |
| 4,729,775 A | * | 3/1988 | Patte et al. | |
| 5,100,442 A | | 3/1992 | Gore et al. | |
| 6,228,154 B1 | | 5/2001 | Pakkala et al. | |
| 2002/0189449 A1 | * | 12/2002 | Klobucar et al. | |

* cited by examiner

Primary Examiner—Duane S. Smith
(74) Attorney, Agent, or Firm—Howard & Howard

(57) ABSTRACT

A scrubber assembly for removing particulate paint from a flow of air through a paint application booth is disclosed. A sheet of water received from a water source flows over flood pan collecting paint particles suspended in the flow of air. A separation chamber receives air and particulate paint from the booth and water from the flood pan through first and second scrubbers. The first and second scrubbers extend downwardly from the flood pan. Each scrubber includes an inlet receiving air and particulate paint from the paint application booth and water from said flood pan. The first scrubber includes a first outlet discharging a first stream of air, particulate paint, and water received from the first inlet. The second scrubber includes a second outlet discharging a second stream of air, particulate paint and water received from the second inlet. The first and second streams intersect within the separation chamber.

36 Claims, 3 Drawing Sheets

SCRUBBER FOR PAINT BOOTHS

This application claims priority to U.S. Provisional Application No. 60/277,856 filed Mar. 22, 2001. This invention relates generally to a gas scrubber system for removing contaminants in the air of a work area. More particularly, this Application relates to an improved gas scrubber system for use in a vehicle paint spray booth which provides improved gas scrubbing properties.

FIELD OF THE INVENTION

BACKGROUND OF THE INVENTION

Modern automotive paint shops include a continuous process during which vehicle bodies are painted while traveling along a conveyor through a paint booth. While advances in technology have improved the transfer of particulate paint atomized by paint guns to these vehicle bodies, a substantial amount of particulate paint does not adhere to these vehicle bodies and can remain airborne within the paint booth. The resulting effect of these airborne particles that have not adhered to the desired vehicle body includes paint defects, particularly when an airborne particle from a first color lands upon a subsequent vehicle being painted with a second color. If these particles remain airborne within the paint booth, the booth itself can become coated with the paint particles. Further, the airborne paint particles can present a health hazard to workers that are required to be in the booth during the painting process.

In order to maintain a clean environment within the paint booth, a continuous downflow of air is maintained within the booth to force the paint particles through openings in the booth floor thereby removing these paint particles, and any other airborne contaminants, from the paint booth. In order to prevent these airborne paint particles from adhering to the booth and to the equipment that generates the downward flow of air within the booth, a sheet of water constantly flows along a flood pan disposed beneath the paint booth floor. A significant percentage of paint particles are captured by this sheet of water, which includes a chemical solution capable of detackifying the paint particles and causing the paint particles to coagulate for subsequent filtration from the water flowing along a flood pan.

The water flowing along the flood pan, and the air flowing downward from the paint booth, which still contains airborne paint particles, travels through a scrubber extending downwardly from the flood pan. One such example of a scrubber is disclosed in U.S. Pat. No. 5,100,442, filed Mar. 31, 1992, the contents of which are incorporated into this application by reference. The scrubber causes the water flowing from the flood pan to remove paint particles from the air simultaneously flowing through the scrubber with the water.

The scrubber includes a constricted outlet that causes the water to be broken up into droplets. Because the droplets are relatively large, typically on an order of 100 micrometers, a significant amount of time relative to the flow of water and air is taken for the water to accelerate to the full speed of the air flowing through the scrubber. Because the paint particles are relatively small, on the order of 1–10 micrometers, the paint particles accelerate to the full air speed in a much shorter period of time relative to the water droplets. The interaction between the water droplets and the paint particles results in a collision causing the particles to be absorbed by the water droplets. As the water droplets and air move further away from the outlet, the ability of the water droplets to scrub the paint particles from the flow of air is reduced because the speed of the water droplets and the paint particles converge. Therefore, paint particles that have not been scrubbed from the flow of air flowing through the scrubber are known to adhere to the apparatus and ductwork that maintains the flow of air through the paint booth resulting in costly and time consuming cleaning maintenance. It is believed that the ability to scrub paint particles from the air reduces significantly as distance increases from the scrubber outlet.

Efforts to improve the scrubbing efficiency of these scrubbers have required an increase in pressure drop of the air flowing through the scrubber by forcing the air to travel through restrictions in the scrubber. Increases in pressure drop result in increases in the level of noise inside the paint booth and the surrounding areas adjacent the paint booth. Further, increasing the pressure drop in a scrubber assembly requires a significant increase in energy usage. Accordingly, attempts have been made to improve the scrubbing efficiency of scrubbers of this type without having to significantly increase the pressure drop of the air flowing through the booth.

SUMMARY OF THE INVENTION AND ADVANTAGES

The present invention is a scrubber assembly for removing particulate paint from a flow of air through a paint application booth. A sheet of water received from a water source flows across a flood pan disposed beneath the paint application booth. A separation chamber receives air and particulate paint from the paint application booth and water from the flood pan. A first and a second scrubber extend downwardly from the flood pan into the separation chamber fluidly connecting the paint booths and the separation chamber.

Each scrubber includes an inlet receiving air and particulate paint from the application booth and water from the flood pan. The first scrubber includes a first outlet discharging a first stream of air particulate paint and water received from the first inlet. A second scrubber includes a second outlet discharging a second stream of air particulate paint and water received from the second inlet. The first and second streams intersect within the separation chamber redirecting the direction of the streams exiting the scrubbers within the separation chamber.

At the location where the water droplets from each scrubber contacts the air stream from the opposing scrubber, the relative velocity is the sum of the drop in velocity and the air velocity. The relative velocity can be up to double the peak relative velocity that the water droplets experience during their initial acceleration through each outlet. The result is an additional scrubbing action that provides the ability to reduce the pressure drop of the flow of air through the scrubbers and still obtain an equivalent scrubbing efficiency yielded by a conventional scrubber assembly. Therefore, the noise level can be reduced within the paint booth and adjacent areas while not having to sacrifice scrubbing efficiency.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 3:
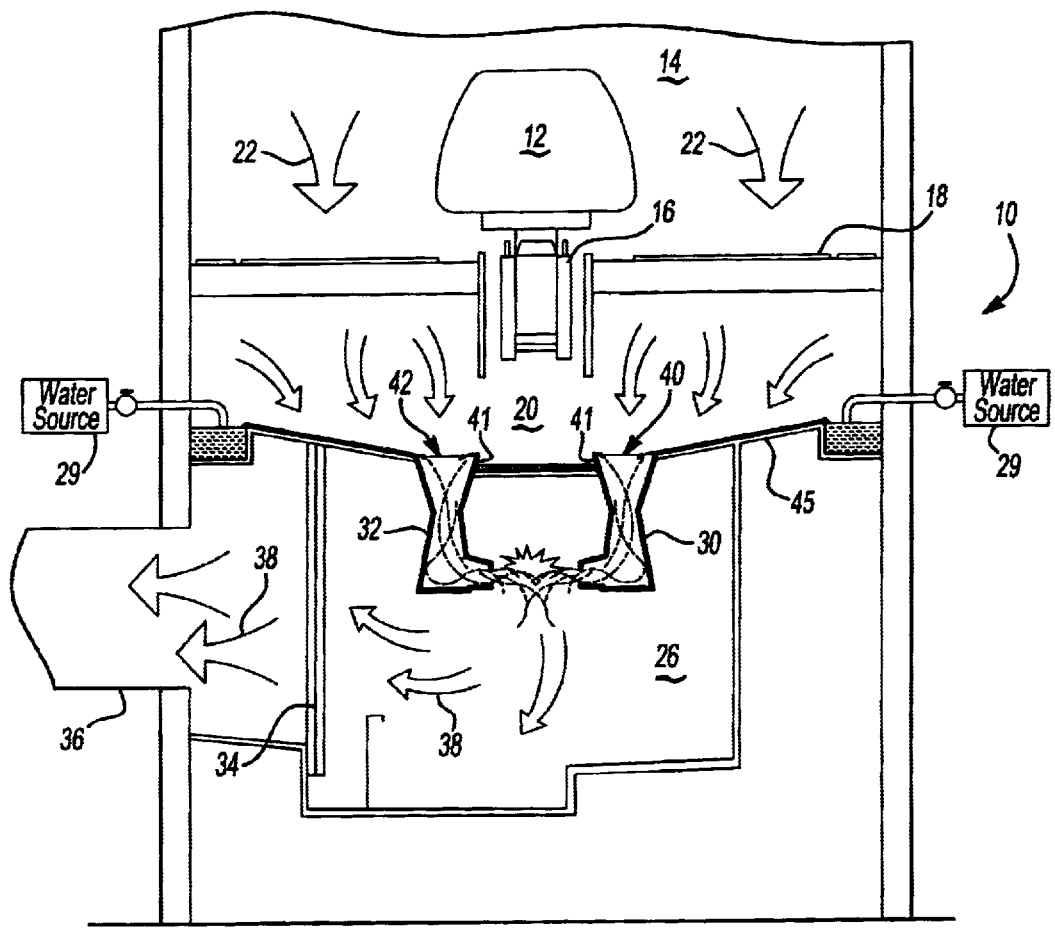
FIG. 3 is a partial, front sectional view of the booth assembly of the present invention showing an alternative flood pan orientation.

An alternative flood pan 45 is shown in FIG. 3. The alternative flood pan 45 preferably angles downwardly towards the scrubbers 30, 32 at an angle of between 5° and 10°. More preferably, the alternative flood pan 45 angles downwardly towards the scrubbers 30, 32 at an angle of generally 7°. The alternative flood pan 45 angles directly into the scrubbers 30, 32 as the flow of water is not restricted by a weir. Therefore, the sheet of water 28 is less deep than the sheet of water 28 flowing over the generally horizontal flood, pan 24 a shown in FIG. 1. The actual depth of the sheet of water 28 depends upon the angle of the alternative flood pan 45. The preferred depth of the sheet of water 28 flowing over the alternative flood pan 45 is less than an inch. More preferably, the depth is generally ⅛ to ¼ inch.

Atomized paint is applied to the vehicle bodies 12 inside the paint application booth 14 by paint application equipment (not shown). Typically, the paint receives an ionic charge from the paint application equipment or associated ionization apparatus to improve the transfer of the paint to the vehicle body 12, which is typically grounded. While a high percentage of paint is adhered to the vehicle bodies 12, a certain percentage of paint does not adhere to the vehicle body 12 and can remain in a suspended state within the application booth 14. Therefore, a downward flow of air received from a source of clean air is maintained in the application booth 14 as indicated by arrows 22.

A porous floor 18 separates the paint application booth 14 from a water plenum 20. The downward flow of air 22 flows into the water plenum 20 disposed beneath the application booth 14 through the porous floor 18. Therefore, atomized paint not adhered to the vehicle body 12 is removed from the application booth 14 and transferred to the water plenum by the downward draft of air 22 flowing through the porous floor 18.

A flood pan 24 separates the water plenum 20 from a separation chamber 26. A sheet of water 28 received from a source of water 29 flows across the flood pan 24 into the separation chamber 26 through a first scrubber 30 and a second scrubber 32. Additionally, the downward flow of air 22 received from the paint application booth 14 flows from the water plenum 20 through the first and second scrubbers 30, 32 into the separation chamber 26.

The paint particles suspended in the downward flow of air 22 through the water plenum 20 are partially removed from the flow of air 22 by contact with the sheet of water 28 flowing over the flood pan 24. Typically, the sheet of water 28 is approximately 3 inches deep. However, different depths of the water 28 may be used. However, some of the paint particles remain suspended in the downward flow of air that travels through the first and second scrubbers 30, 32. The air travels from the separation chamber 26 through a water baffle 34 and into an air return duct 36 as indicated by arrows 38. It is imperative to remove these paint particles from the flow of air 38 into the air return duct 36 to prevent a build-up of paint in the air return duct 36. Further, paint particles not removed from the flow of air 38 are known to increase the emissions from the paint shop (not shown) housing the paint booth 14 when air from the application booth 14 is released to the environment. Therefore, to comply with federal clean air standards, these paint particles must be removed from the flow of air 38 in high percentages. Accordingly, the first and the second scrubber 30, 32 must strip the paint particles from the flow of air by directing the flow of water through the scrubbers to contact the paint particles suspended in the flow of air.

Figure 2:
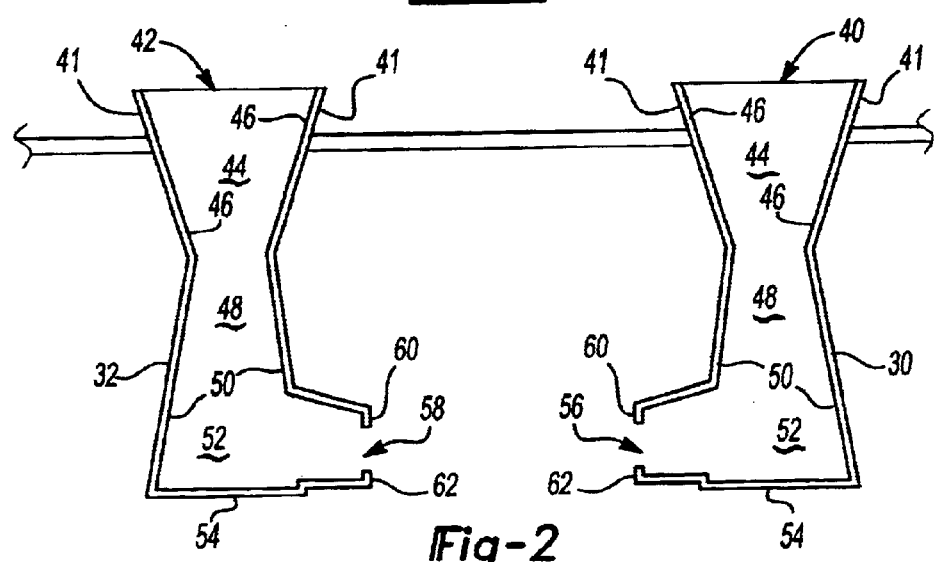
FIG. 2 is front sectional view of the scrubbers of the present invention.

As best seen in FIG. 2, the first scrubber 30 includes a first inlet 40 and the second scrubber 32 includes a second inlet 42. Each scrubber 30, 32 includes a weir 41 extending upwardly of the flood pan 24 to control the flow of water through each scrubber 30, 32. The flood pan 24 is oriented generally horizontal. Each scrubber 30, 32 defines an entry chamber 44 each having planar entry walls 46 angling downwardly and inwardly to define a restricted flow area 48 within each scrubber 30, 32. Beneath the restricted flow area 40, planar exit walls 50 angle downwardly and outwardly defining an air expansion-water acceleration chamber 52. A base wall 54 is disposed beneath the air expansion-water acceleration chamber 52 and is oriented generally parallel to the inlets 40, 42. Therefore, the air and water passing through each scrubber 30, 32 is forced to turn at a generally 90° angle upon impacting the base wall 54.

An alternative flood pan 45 is shown in FIG. 3. The alternative flood pan 45 preferably angles downwardly towards the scrubbers 30, 32 at an angle of between 5° and 10°. More preferably, the alternative flood pan 45 angles downwardly towards the scrubbers 30, 32 at an angle of generally 7°. The alternative flood pan 45 angles directly into the scrubbers 30, 32 as the flow of water is not restricted by a weir. Therefore, the sheet of water 28 is less deep than the sheet of water 28 flowing over the generally horizontal flood pan 43. The actual depth of the sheet of water 28 depends upon the angle of the alternative flood pan 45. The preferred depth of the sheet of water 28 flowing over the alternative flood pan 45 is less than an inch. More preferably, the depth is generally ⅛ to ¼ inch.

The first scrubber 30 includes a first outlet 56 and the second scrubber 32 includes a second outlet 58. The first outlet 56 is positioned directly opposite the second outlet 58. Therefore, the stream of air, water, and particulate paint flowing through the first scrubber 30 intersects with the stream of air, water, and particulate paint flowing through the second scrubber 32 within the separation chamber 26. Each outlet 56, 58 includes a downward directed flange 60 and upward directed flange 62 to decrease the size of the outlets 56, 58 relative to the air expansion-water acceleration chamber 52. Preferably, the streams emitted from the first and second outlet 56, 58 intersect at an angle between generally 90° and 270°. More preferably, the streams intersect at an angle of generally 180°.

Figure 4:
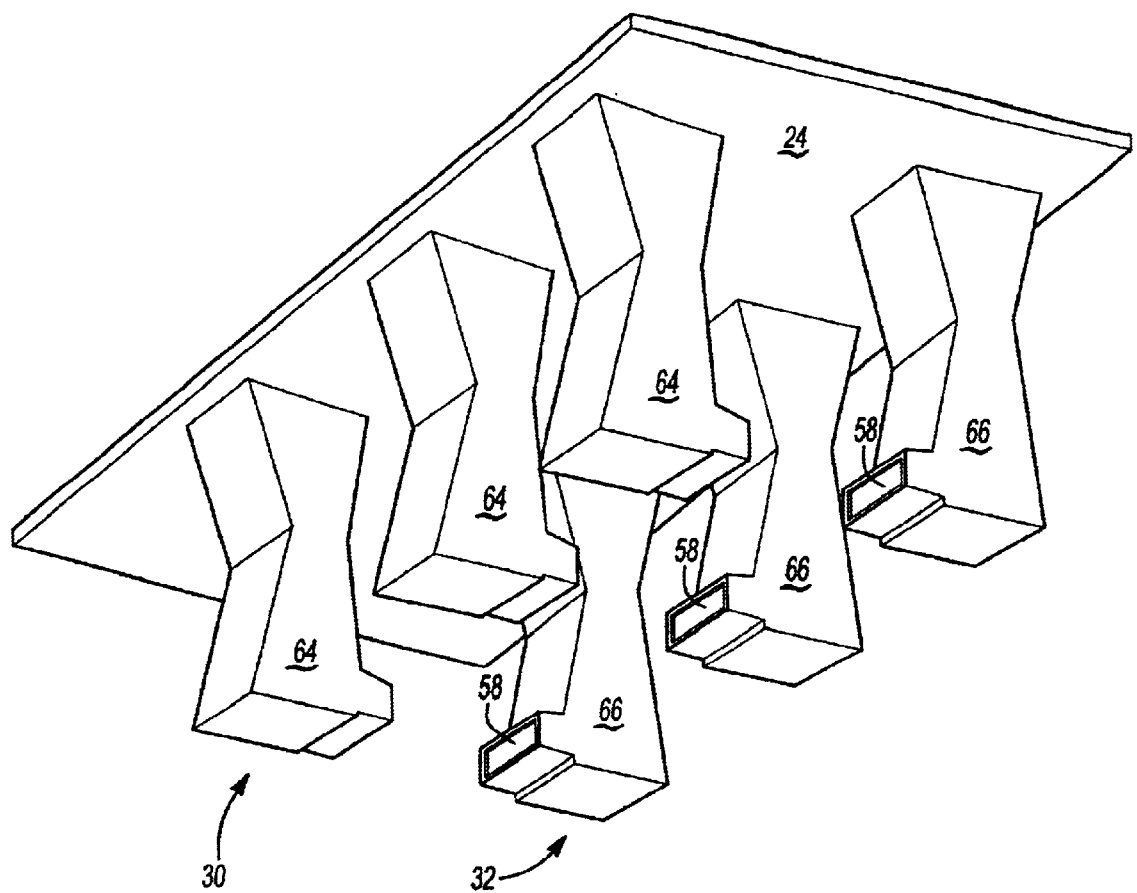
FIG. 4 is bottom perspective view of the scrubbers of the present invention showing discrete scrubber pods.

Referring to FIG. 4, the first and second scrubbers 30, 32 extend longitudinally along a length of the paint booth 14 in a generally parallel relationship. The first and second scrubbers 30, 32 define a row of discrete first scrubber pods 64 and a row of second discrete scrubber pods 66. Each of the first pods 64 are aligned in a generally parallel relationship, with each of the second pods 66. Alternatively, the first and second scrubbers 30, 32 extend the entire length of the booth 14 and do not comprise discrete pods.

The collision of water droplets formed from the stream of water flowing though the scrubbers 30, 32 and the paint particles suspended in the flow of air through the scrubbers 30, 32 cause the paint particles to be stripped from the flow of air. The water droplets formed within the scrubbers are known to be relatively large on the order of 100 micrometers. Paint particles, however, are much smaller than the water droplets having a size of about 1–10 micrometers. Therefore, the paint particles are known to travel closer to the rate of air speed which is greater than the rate of flow of the water droplets. The most efficient scrubbing occurs when the rate of travel of the water droplets is less than the rate of travel of air and the paint particles. When the rate of travel of the water droplets approaches the same rate of travel of the air and paint particles the scrubbing efficiency is significantly reduced. Pressure drops within the scrubbers 30, 32 are known to cause the rate of travel of the water droplets and the air and particulate paint to diverge improving scrubbing efficiency. However, pressure drop also causes significant noise problems within the paint application booth 14 and the areas immediately adjacent the booth.

Figure 1:
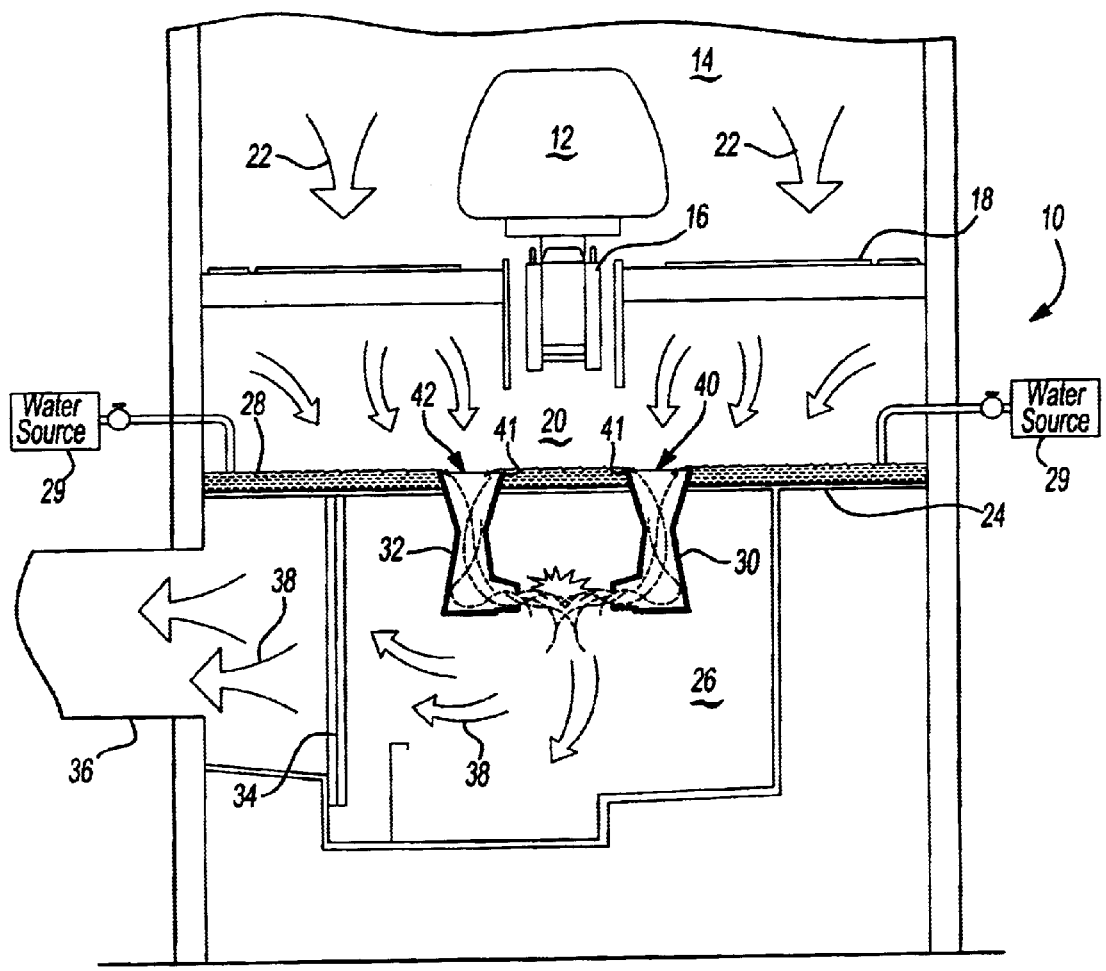
FIG. 1 is partial, front sectional view of the booth assembly of the present invention.

An improved scrubbing efficiency occurs in the separation chamber 26 in the area where the stream of air, particulate paint, and water exiting the first outlet 56 collides with the stream of air, particulate paint, and water exiting the second outlet 58 as is best represented in FIG. 1. The stream of air exiting from each of the outlets 56, 58 changes direction at approximately an angle of 90 degrees within the separation chamber 26 at the point of collision. However, the water droplets continue to travel in a straight path due to the mass and momentum of the water droplets. Therefore, the water droplets exiting the first outlet 56 collide with the stream of air exiting the second outlet 58. Likewise, the water droplets exiting the second outlet 58 collide with the air exiting the first outlet 56. The point at which the water droplets enter the opposing air stream, the relative velocity of the streams of air, particulate paint, and water is the sum of the droplet velocity and the air velocity. This relative velocity can be up to double the peak relative velocity that the water droplets experience within each scrubber 30, 32. Accordingly, the scrubbing efficiency is significantly increased over that of a conventional scrubber assembly.

Tests were conducted to prove that the scrubber assembly 10 of the present invention was more efficient at converting pressure drop into scrubbing efficiency. As shown in Table 1, the testing included variable pressure drops within the scrubbers 30, 32.

| Test Number | Scrubber Pressure Drop (in w.c.) | Air Flow (scfm) | Water Flow (gpm) | Particulate Emissions (gr/1000 dscf) |
|---|---|---|---|---|
| 1 | 5.5 | 20,336 | 300 | 0.999 |
| 2 | 4.0 | 20,256 | 300 | 1.449 |
| 3 | 3.0 | 20,030 | 300 | 2.014 |
| Conventional Scrubber | 5.5 | 20,652 | 300 | 1.290 |

A conventional scrubber was run with a pressure drop of 5.5 w.c. Three other tests were conducted with in the inventive scrubber assembly 10 using pressure drops of 5.5 w.c., 4.0 w.c. and 3.0 w.c. The test results indicate that at equivalent pressure drop within the scrubbers the inventive scrubber assembly 10 reduced the particulate emissions, i.e., improved scrubber efficiency. When the pressure drop was reduced in the inventive scrubbers to 4.0 w.c., the particle emissions were statistically equivalent to the particle emissions of the conventional scrubber. Therefore, it is believed that the inventive scrubbers can be run at a lower pressure drop, which provides significant acoustical benefits within the booth 12 and adjacent areas yet obtain equivalent scrubbing efficiency as a conventional scrubber.

More significantly, by reducing the requisite pressure drop, a significant reduction in the amount of energy required to operate the assembly 10 is realized. Two fans (not shown) typically control the flow of air through the assembly 10, a supply fan and an exhaust fan. The supply fan provides fresh, filtered air to the application booth 14, and the exhaust fan evacuates air from the booth 14. A pressure drop designed into the scrubbers 30, 32, makes it more difficult to push air through the booth and to evacuate air from the booth. Therefore, both the supply fan and the exhaust fan must be run at a higher speeds requiring more power to overcome increased pressure drop within the scrubbers 30, 32. Accordingly, a reduction in the requisite pressure drop within the scrubbers 30, 32 provides an energy savings while operating the assembly 10 by enabling the fans.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A scrubber assembly for removing particulate paint from air flowing downwardly through a paint application booth comprising:

a flood pan having a sheet of water from a water source flowing thereover;

a separation chamber receiving air and particulate paint suspended in the air from the booth and water from said flood pan; and a first and a second scrubber extending downwardly below said flood pan, each scrubber having an inlet receiving air and particulate paint suspended in the air from the paint application booth and water from said flood pan, wherein said first scrubber includes a first outlet discharging a first stream of air, particulate paint, and water received from said first inlet and said second scrubber includes a second outlet discharging a second stream of air, particulate paint and water received from said second inlet, said first outlet and said second outlet being oriented to direct said first and second streams to intersect within said separation chamber.

2. An assembly as set forth in claim 1 wherein said first and said second scrubber extend longitudinally along a length of the paint booth in a generally parallel relationship.

3. An assembly as set forth in claim 2 wherein said first scrubber defines a plurality of discreet first scrubber pods arranged in a row and said second scrubber defines a plurality of discreet second scrubber pods arranged in a row, each of said first pods being aligned in a generally parallel relationship with each of said second pods.

4. An assembly as set forth in claim 1 wherein each of said scrubbers defines a restriction disposed therein for restricting the flow of noise generated by said outlet from entering the spray booth.

5. An assembly as set forth in claim 1 wherein each of said scrubbers include a generally planar base wall defining a generally 90° bend within said scrubber leading to said outlet.

6. An assembly as set forth in claim 1 wherein each of said scrubbers includes a weir extending upwardly from said flood pan thereby restricting the flow of water received from said flood pan through said scrubber.

7. An assembly as set forth in claim 1 wherein said first stream generated by said first scrubber intersects at an angle between generally 90° and 270° with said second stream generated by said second scrubber.

8. An assembly as set forth in claim 1 wherein said first stream generated by said first scrubber intersects at an angle of generally 180° with said second stream generated by said second scrubber.

9. An assembly as set forth in claim 1 wherein said separation chamber includes at least one de-watering member for separating the water from the stream of air and water received from said scrubbers.

10. An assembly as set forth in claim 1 wherein said flood pan is disposed in a generally horizontal orientation.

11. An assembly as set forth in claim 1 wherein said flood pan slopes downwardly towards said scrubbers at an angle between generally 5° and 10°.

12. An assembly as set forth in claim 11 wherein said flood pan slopes downwardly towards said scrubbers at an angle of generally 7°.

13. A method of removing particulate paint from a stream of air flowing through a paint application booth comprising the steps of:
providing a source of water;
providing a first and a second scrubber, each extending downwardly below said application booth;
directing water received from the source of water downwardly through said first and second scrubbers;
directing the stream of air and particulate paint suspended in the stream of air downwardly from said application booth into said first and second scrubbers simultaneously with the water received from said source of water;
directing the stream of air, particulate paint, and water flowing through said first scrubber to collide with the stream of air, particulate paint, and water flowing through said second scrubber thereby scrubbing the particulate paint from the stream of air flowing from said paint application booth through said first and second scrubbers.

14. A method as set forth in claim 13 further including the step of forming water droplets from the stream water flowing through said first and said second scrubbers.

15. A method as set forth in claim 13 wherein a rate of travel of said water droplets traveling through said first and said second scrubbers is less than a rate of travel of the air and the paint particles travelling through said first and said second scrubbers.

16. A method as set forth in claim 13 further including the step of accelerating the rate of travel of the water droplets flowing through said first and second scrubbers to a generally equivalent rate of travel of the air and the paint particles travelling through said first and said second scrubbers.

17. A method as set forth in claim 13 further including the step of redirecting the stream of air flowing from said first scrubber by directing said stream of air from said first scrubber to collide with the stream of air, particulate paint, and water flowing from said second scrubber.

18. A method as set forth in claim 13 further including the step of redirecting the stream of air flowing from said second scrubber by directing said stream of air from said second scrubber to collide with the stream of air, particulate paint, and water flowing from said first scrubber.

19. A method as set forth in claim 13 further including the step of separating the stream of air flowing through said separation chamber from the water and particulate paint flowing through said separation chamber.

20. A method as set forth in claim 13 wherein said step of directing the stream of air, particulate paint, and water flowing through said first scrubber to collide with the stream of air, particulate paint, and water flowing through said second scrubber is further defined by directing the streams of air, particulate paint, and water to intersect at an angle of generally 180°.

21. A method as set forth in claim 13 wherein said step of directing the stream of air, particulate paint, and water flowing through said first scrubber to collide with the stream of air, particulate paint, and water flowing through said second scrubber is further defined by directing said air, particulate paint, and water to intersect at an angle between generally 90° and 270°.

22. A method as set forth in claim 13 further including the step of stripping paint particles from the stream of air flowing from said first scrubber with the stream of water flowing from said second scrubber.

23. A method as set forth in claim 13 further including the step of stripping paint particles from the stream of air flowing from said second scrubber with the stream of water flowing from said first scrubber.

24. A paint booth assembly for painting a product comprising:
an application booth, wherein paint is applied to a product inside said booth having air flowing in a downward direction thereby removing particulate paint not adhered to the product from said booth;
a source of water providing a sheet of water flowing beneath said application booth;
a first and a second scrubber extending downwardly below said booth;
a separation chamber receiving air and particulate paint suspended in the air from said booth and water from said source of water through said first and said second scrubber; and
said first and second scrubbers extending downwardly beneath said application booth, each scrubber having an inlet receiving air and particulate paint from said paint application booth and water from said source of water, wherein said first scrubber includes a first outlet discharging a first stream of air, particulate paint, and water received from said first inlet and said second scrubber includes a second outlet discharging a second stream of air, particulate paint and water received from said second inlet, said first and second outlets oriented to direct said streams to intersect within said separation chamber.

25. An assembly as set forth in claim 24 further including a flood pan disposed between said application booth and said separation chamber, said flood pan having water received from said source of water flowing thereover.

26. An assembly as set forth in claim 24 wherein said flood pan is disposed in a generally horizontal orientation.

27. An assembly as set forth in claim 24 wherein said flood pan slopes downwardly towards said scrubbers at an angle of between generally 5° and 10°.

28. An assembly as set forth in claim 27 wherein said flood pan slopes downwardly towards said scrubbers at an angle of generally 7°.

29. An assembly as set forth in claim 25 wherein said application booth includes a porous floor allowing air received from said source of air to flow therethrough.

30. An assembly as set forth in claim 29 further including a water plenum disposed between said porous floor and said flood pan.

31. An assembly as set forth in claim 24 wherein said first and said second scrubber extend longitudinally along a length of said paint booth in a generally parallel relationship.

32. An assembly as set forth in claim 24 wherein said first scrubber defines a plurality of discreet first scrubber pods arranged in a row and said second scrubber defines a plurality of discreet second scrubber pods arranged in a row, each of said first pods being aligned in a generally parallel relationship with each of said second pods.

33. An assembly as set forth in claim 24 wherein each of said scrubbers defines a restriction disposed therein for restricting the flow of noise generated when the stream of air, particulate paint, and water exits said scrubbers through said outlets.

34. An assembly as set forth in claim 24 wherein said first stream generated by said first scrubber intersects with said second stream generated by said second scrubber and an angle between about 90° and 270°.

35. An assembly as set forth in claim 24 wherein said first stream generated by said first scrubber intersects with said second stream generated by said second scrubber at an angle of generally 180°.

36. An assembly as set forth in claim 24 wherein said separation chamber includes at least one de-watering member for separating the water from the stream of air and water received from said scrubbers.

* * * * *